United States Patent [19]
Thomas, Jr.

[11] Patent Number: 5,161,977
[45] Date of Patent: Nov. 10, 1992

[54] SCHOOL SUBJECT LEARNING AID AND TUTOR

[76] Inventor: Larry D. Thomas, Jr., 3516 Melanie La., Plano, Tex. 75023

[21] Appl. No.: 636,683

[22] Filed: Dec. 31, 1990

[51] Int. Cl.⁵ .......................... G09B 3/00; G09B 7/00
[52] U.S. Cl. .................................. 434/322; 434/327; 434/340
[58] Field of Search ............... 434/340, 341, 322, 327

[56] References Cited

U.S. PATENT DOCUMENTS

| | | | |
|---|---|---|---|
| 3,504,448 | 4/1970 | Moore et al. | 434/340 |
| 3,654,706 | 4/1972 | Perrella | 434/340 |
| 3,735,501 | 5/1973 | Ma | 434/341 |
| 4,023,807 | 5/1977 | Santianni | 434/340 |
| 4,115,931 | 9/1978 | Futhey | 434/341 |
| 4,824,376 | 4/1989 | Arash | 434/330 |
| 4,868,374 | 9/1989 | Schott et al. | 235/441 |
| 4,921,427 | 5/1990 | Dunn | 434/340 |

Primary Examiner—Gene Mancene
Assistant Examiner—Cindy A. Cherichetti

[57] ABSTRACT

A learning aid and tutor for school subjects. Comprised of a main-unit which accepts a media for recorded information for a learning activity. The learning activity is both entering the subject matter into the information media, note taking, and using that information media to support a multiple-choice mock-test. The media is customized by and for the user, to subject currently of interest to the user. This media has an answer-to-question correlation function which allows random presentation of information for repeated use. The main-unit has a means for selecting the question in reference to this media and a means for the user to select the corresponding answer in reference to this media. The main-unit has a means for indicating to the user the correctness and incorrectness of their answer selections.

2 Claims, 7 Drawing Sheets

SCHOOL SUBJECT LEARNING AID AND TUTOR

BACKGROUND—FIELD OF INVENTION

This patent relates to learning aids for School Subjects; like Science, History, Math, English and others.

BACKGROUND—DESCRIPTION OF PRIOR ART

Elementary age students have primarily three options for studying their school subjects outside of class. First, they are on-their-own to read text books thus learning and remembering all they can from just reading the information. The second option is to enlist parents in a MOCK TEST review process. In this MOCK TEST, the student defines the subject and topic (usually page number in a text book) and the parent proceeds to read and extract MOCK QUESTIONS from the text. This usually ends in flustration for both the parent and the student. The parent gets flustrated when the student has not studied sufficiently to know the information or the material is difficult to extract questions from. The student gets flustrated because the parent is not asking questions on the items the student studied or the student needs more practice. The third is a long practiced and recommended modification of the above study methods. As the student reads the text, write major topics on a piece of paper. This paper serves a very good review tool and study guide. In fact it is very useful for the parent who gets trapped in this MOCK TEST exercise.

Although usually not an option, the student can use electronic learning aids which normally have a "preprogrammed" subject/topic which is not adaptable to the current topic of study in school. Computers are capable of this adaptable, multi-subject study function but requires a level of money and programming experience which most households do not have.

If any of these achieve the desired result, it is only through major effort for all involved and endurance of much mental and emotional pain and suffering.

Having had much experience with these unpleasant study activities (both as the parent and as the student), the inventor has developed an alternative learning aid and tutor "THOMAS TUTOR", which incorporates the best of all the old methods but allows the student to study successfully alone.

OBJECTIVES AND ADVANTAGES

Several objectives and advantages to this invention are:

a) making use of the good study practice of writing major topics on paper as the student reads the text, b) uses MOCK TEST review activity without depending on someone else to correct your mistakes, c) the ability to change subjects very easily while retaining the information from prior study sessions, d) this invention is very easy to use, e) it is best suited for the elementary age student but can be valuable to the secondary school student and adult student, and f) a major advantage is the self powered feature of one embodiment of this invention.

LIST OF REFERENCE NUMERALS

10—RECESSED AREA
12—"CORRECT" DISPLAY
14—"TRY AGAIN" DISPLAY
16—QUESTION SELECT PUSH BUTTON
18—ANSWER SELECT PUSH BUTTON
20—PERFORATED LINES IN PAPER
22—ANSWER SECTION OF PAPER
24—CODING HOLES (ANSWER)
26—SLIT FOR INSERTING PAPER
28—LEFT/QUESTION SECTION OF PAPER
30—PIEZO FILM (POWER SOURCE)
32—ELASTIMER (CONDUCTIVE RUBBER)
34—CONDUCTIVE PADS ON P.C.B.
36—PRINTED CIRCUIT BOARD (P.C.B.)
38—BATTERY OR BATTERY PACK (FOR BATTERY POWERED EMBODIMENT)

DESCRIPTION OF INVENTION—INTRODUCTION

This patent disclosure is for an learning aid/tool and tutor, which I will refer to as "THOMAS TUTOR" or TT for short. This device is primarily useful to elementary age children but will also be useful to older children and adults students.

Figure 1:
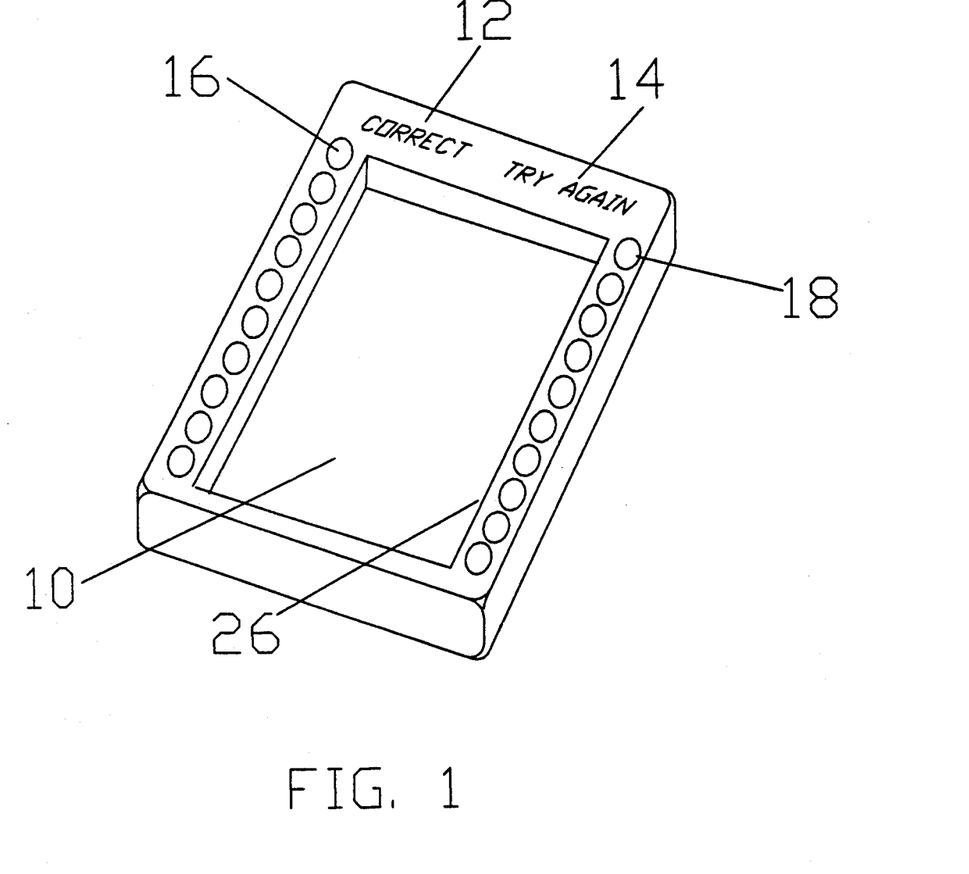
FIG. 1 is an overall view of main-unit, of this invention, and defines the user features.

A basic description of "THOMAS TUTOR" is a clipboard size electronic main-unit, which allows its user to enter information (by writing on specially prepared paper or interactive media) and then reviewing the information by taking an interactive Multiple-choice "MOCK TEST". See FIG. 1. The data can be reused many times and other data may be entered on new paper. Although the device is interactive and electronic, it DOES NOT require batteries or light sources to power it. The action of pressing buttons 16 and 18 on the TT both select the question and answer as well as powers the electronic display which indicates to the user if their answer is "CORRECT" 12 or if they should "TRY AGAIN" 14. The same functionality is possible with a battery powered version. A battery power embodiment is not described here but is included in the patent definition.

DESCRIPTION OF INVENTION—EMBODIMENT EXAMPLE

The following is one implementation or embodiment of the invention and demonstrates most of its features. This embodiment is approximately the size of a standard clipboard, 10 inches wide by 14 inches high and less than 1 inch thick. The center of the device is recessed 10, about the size of a standard sheet of paper (8"×11").

This area is to accept the specially prepared paper media that TT uses.

Figure 2:
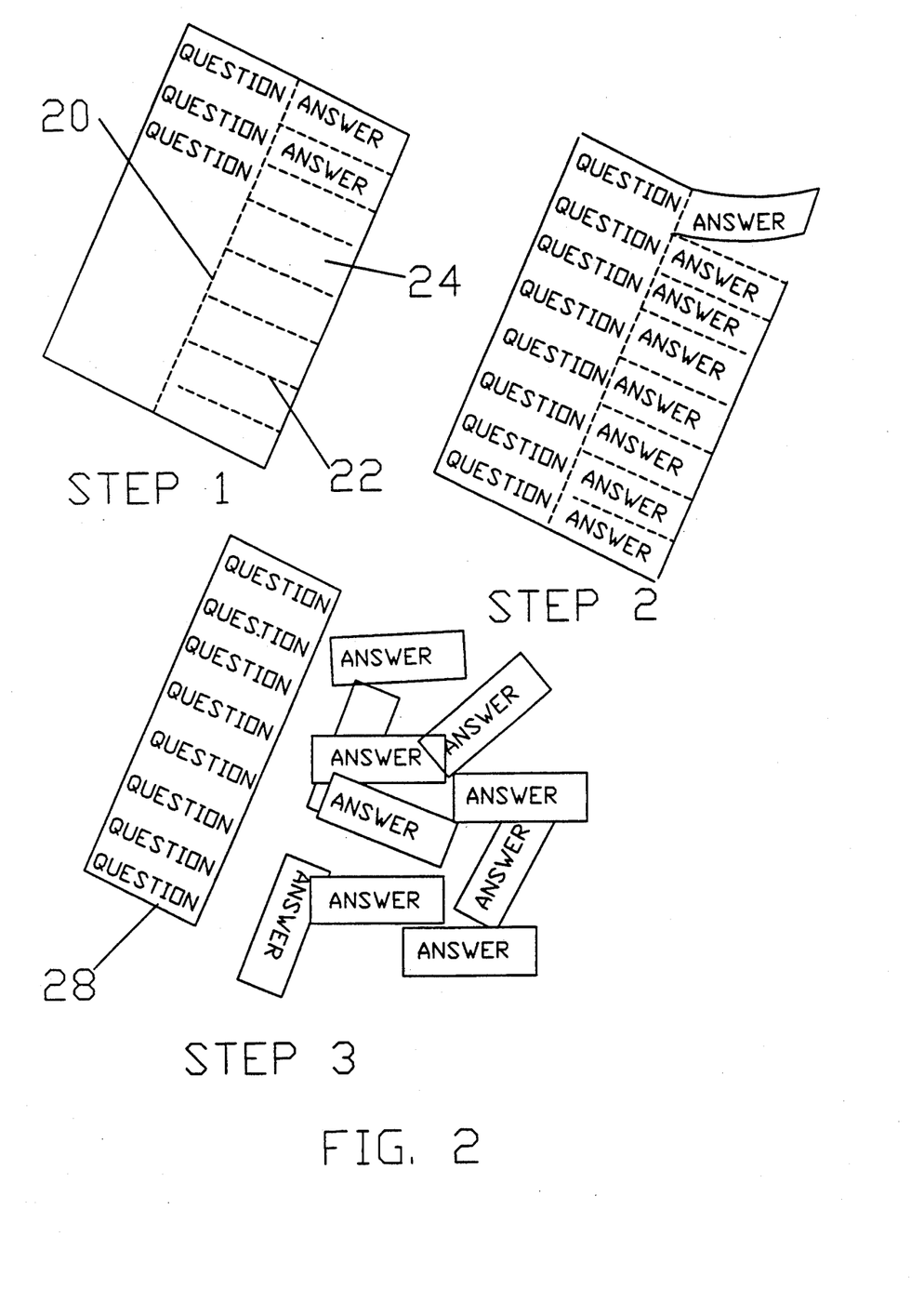
FIG. 2 shows the paper media and its functionality using three steps of preparation for use: 1 write question and answers on the paper while intact, 2 separate the answers from one another and from the questions section, 3 mix the order of the answers before inserting into the "THOMAS TUTOR".
Figure 3:
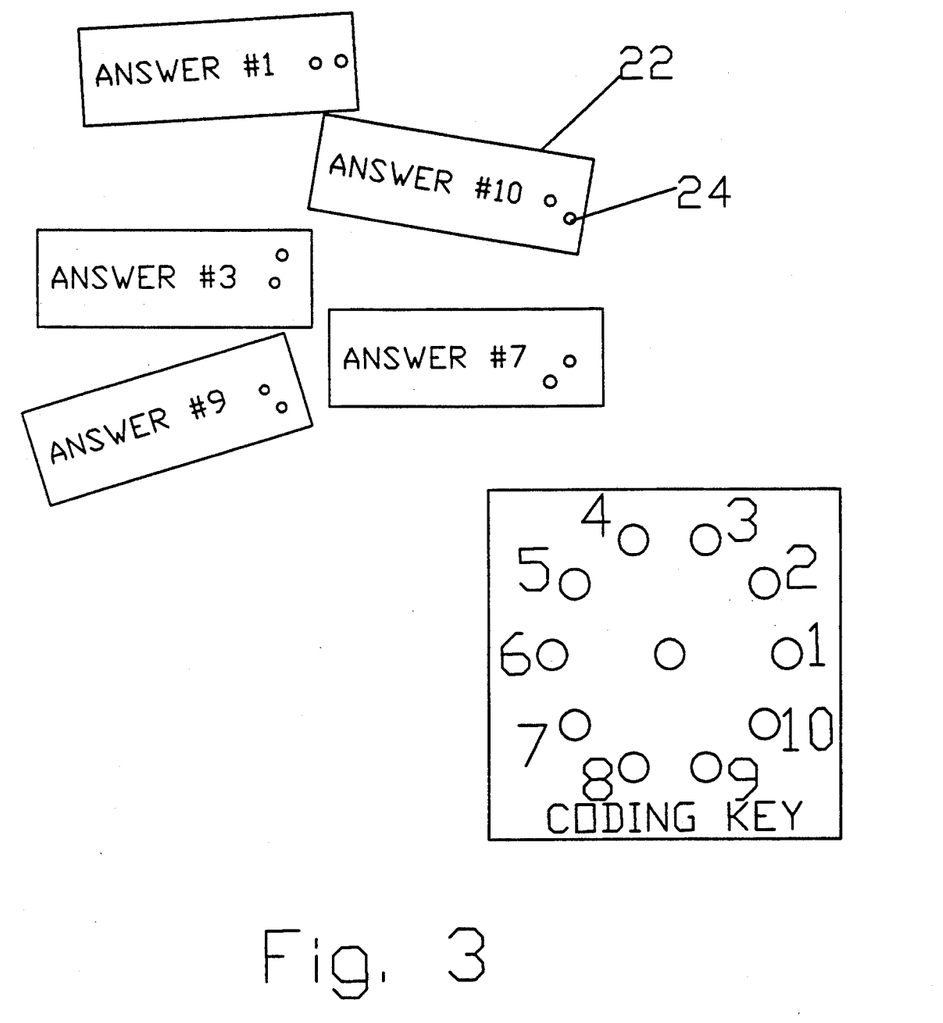
FIG. 3 shows the answer coding technique used in the invention.
Figure 4:
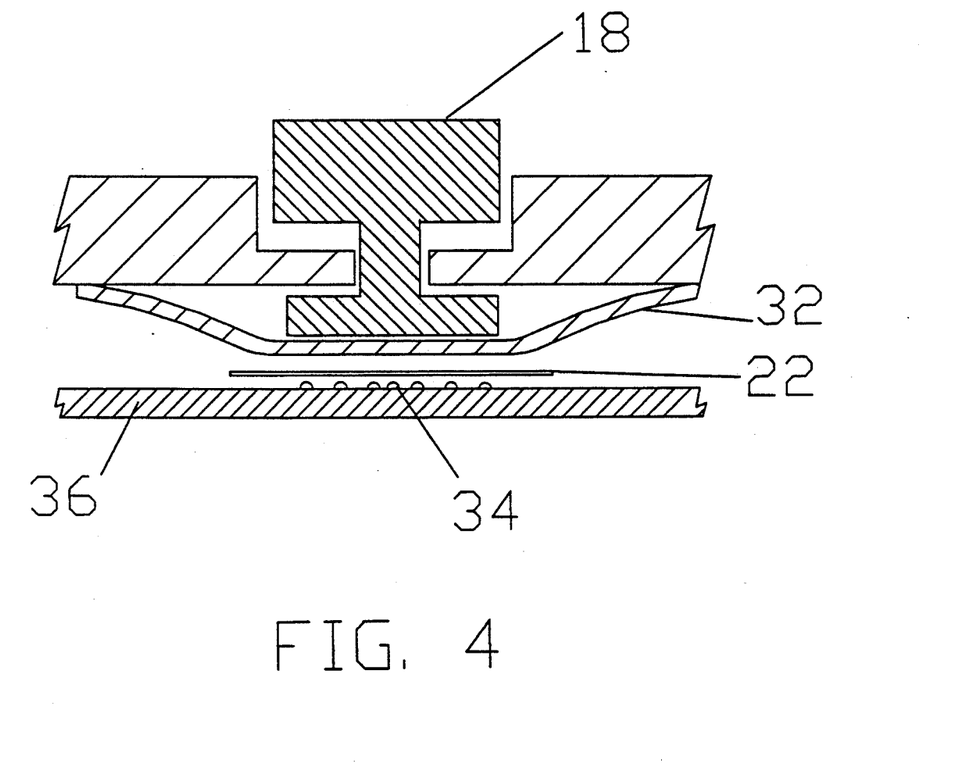
FIG. 4 is a cross section of the push button and code detector.

This paper media is the weight of construction paper and is about 8-½" by 11". See FIG. 2. It is ruled for writing but also has perforated lines 20 to separate the left and right sides and to subdivide the right side into horizontal sections sized to contain one answer per section 22. This paper also has some very small holes 24 along the right hand edge. The purpose of these hole will be explained later.

Back to the main-unit itself. The recessed area is slightly smaller than the paper described above and allows for the right edge (the one with the small holes in it) to be slid or tucked under a lip or into a slit 26. This allows the sensing of the hole pattern 24, which determines correct or incorrect answers. The left half of the paper lays in the recessed area intact but the right hand half is inserted into the main-unit one small section at a time, allowing the sequence to be different than the sequence on the left half. Two locating pins were found necessary for positioning of each of the small section on the right hand side of the device.

ELECTRONIC OPERATION

The electronic function of TT is based on interconnections (SEE FIG. 7) through the buttons 16 and 18, described above, to the LCD display(s) 12 and 14 and piezo 30 devices under the buttons 18 on the right side of the embodiment described above. Also the hole pattern 24 in the paper identifies which answer goes with which question. The hole pattern is basically a clockwise sequence of a hole starting at 1 o'clock in the top position (first answer) and 2 o'clock in the next position and so on until all answer/question positions have been identified. The action of pressing the left hand button 16 selects which top to bottom "question" is active and the right hand button 18 will make contact through the hole 24 in the paper 22 identifying which position it was in when originally written (while the sheet was in tact). Thus identifying it as the answer for a particular question. The action of pressing a button 18 on the right side also moves/activates the piezo film 30 generating power to activate the connected display 12 or 14. A battery powered version would function basically in the same manor; displays 12 and 14 could be LED or incandescent.

Figure 5:
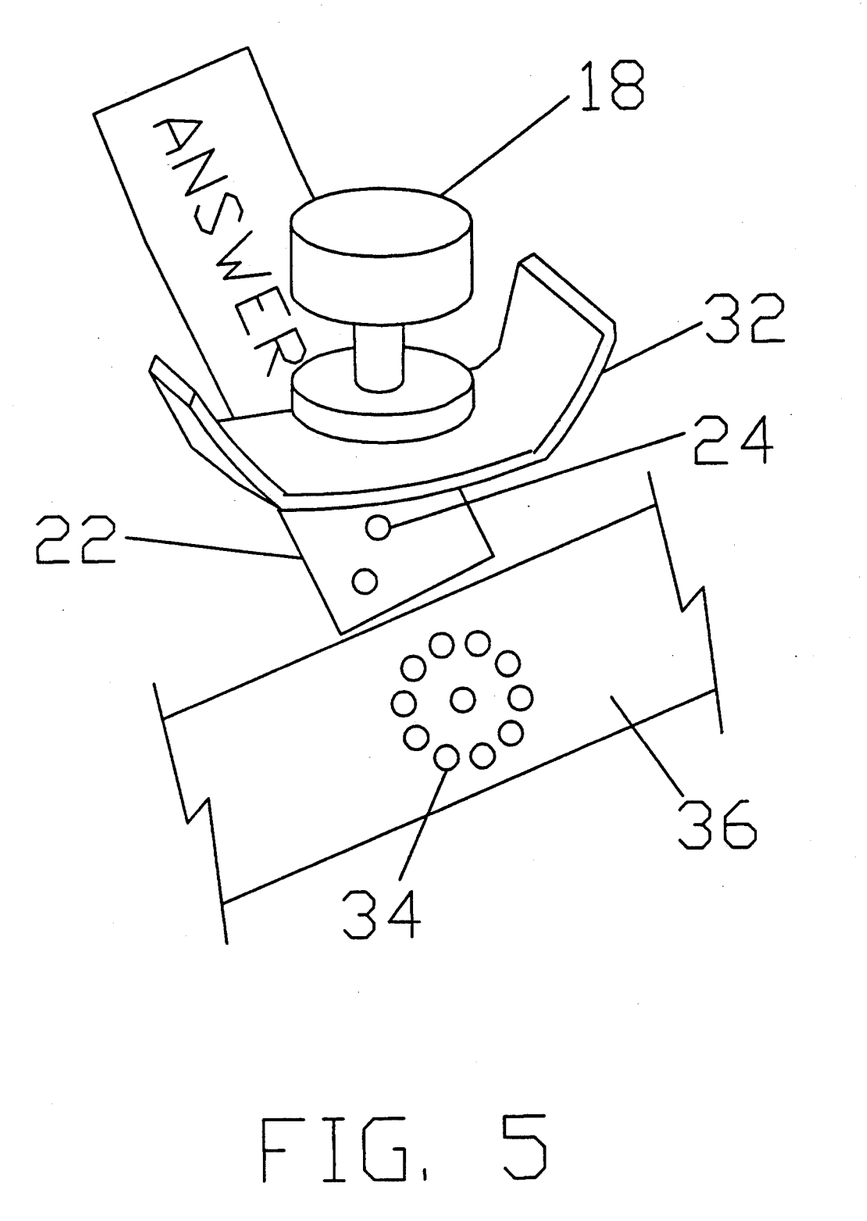
FIG. 5 is an exploded view of the answer push button and coding detector.
Figure 6:
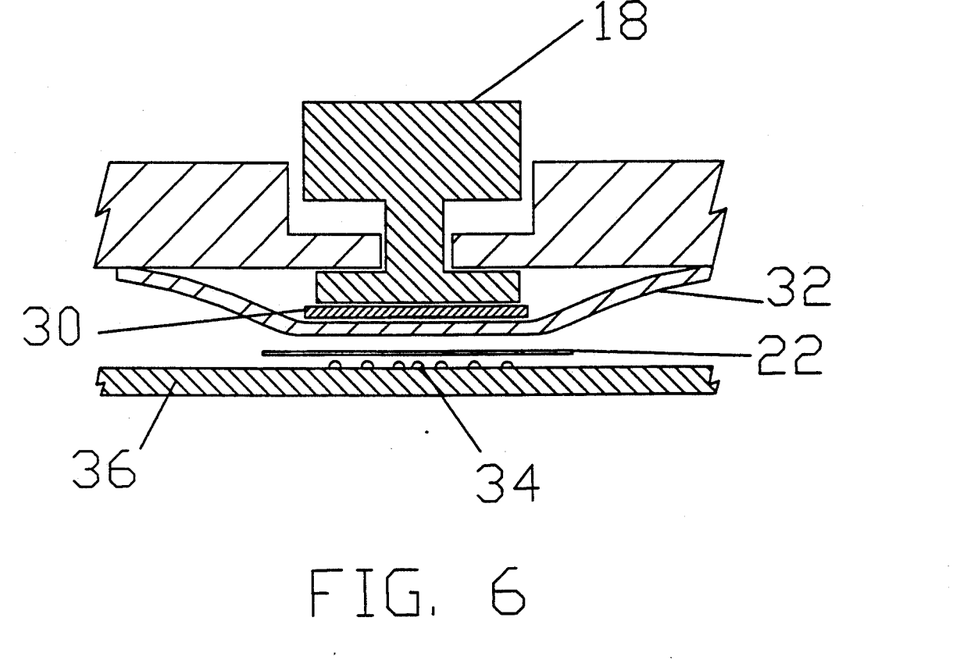
FIG. 6 shows the self-powered function modification to the push button and coding detector cross section.

FIG. 5 is an exploded view of the answer push button and coding detector. The push button plunger 18 is the top component. It 18 pushes against an elastimer 32 (electrically conductive rubber material), which is stretched over each button's 18 lower surface. This elastimer serves as a return spring action and as a shorting surface as the button 18 is depressed. This shorting surface 32 is pressed against the small "answer" piece of paper 22, thus shorting the exposed conductive pads 34, located on the printed circuit board 36, which runs under all the right hand column of buttons 18. Only the pads 34 which are exposed through the coding holes 24 in the paper 22 are shorted.

Figure 7:
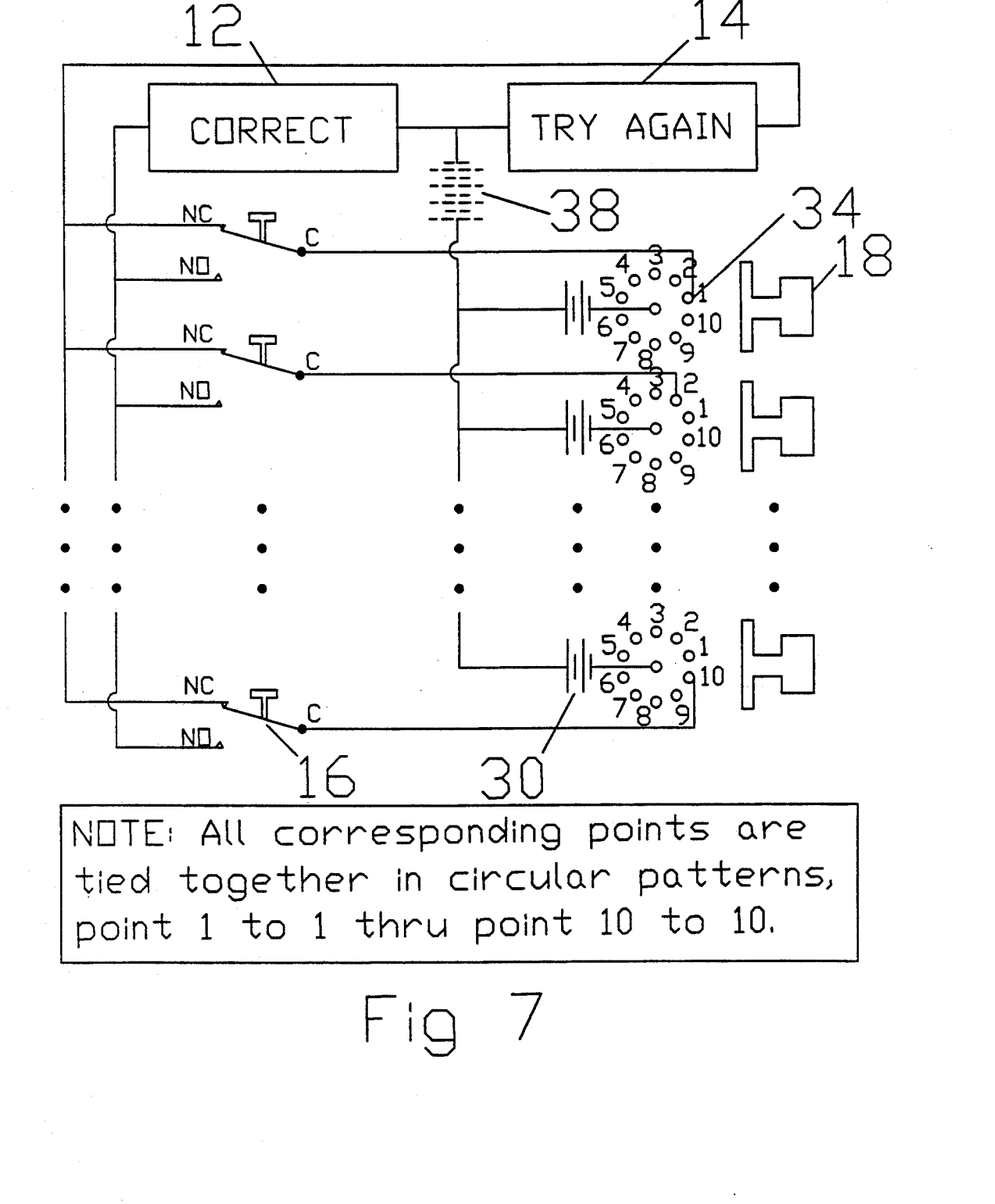
FIG. 7 is a schematic of the electrical wiring of the invention.

FIG. 7 is a schematic of the device and explains how the interconnects are accomplished. The momentary push buttons 16 on the left hand side of the device are used to select the "CORRECT" display 12 when depressed and the "TRY AGAIN" display 14 in the normal released position.

The battery symbol in the schematic depicts the piezo film 30 that is deformed and thus generates electricity each time the corresponding answer push button 18 is depressed. This piezo film can be replaced by a single battery or battery pack 38 placed at the common connection of the displays 12 and 14, for the battery powered embodiment.

The broken lines with continuation dots, represents the flexibility in the number of replications of the circuit that are possible with this invention. There is a range of 10 to 30 questions/answers and therefore question buttons 16 and answer buttons 18. The minimum of 10 is to give an adequate number to make the MOCK TEST challenging and the maximum of 30 is estimated as the maximum hand writing space will allow.

OPERATION OF INVENTION

To help described the operation of the device, here is an example of how a user would enter data and use the paper and the "THOMAS TUTOR". A subject is selected, Science for example. The user writes, on a new sheet of TT paper, the Science words on the left side 28 of the paper and the definition, on the corresponding line, on the right side 22. Once a complete list is written down, the user would tear along the perforations (top to bottom) to first separate the words from the definitions. Then tear along the perforations to separate the definitions from one another. The larger piece (left half, with the words) 28 would lay on the left side in the recess. The small pieces (with the definitions) 22 would be tucked into the slot 26 on the right side. (Locating pins or a raised shoulders in the recessed area 10 would guide the user on where to place the pieces of paper 22.) This separation into smaller pieces allows the definitions to be placed in a random order but still next to the Science words.

Along the left and right edges of the device itself is a vertical columns of buttons 16 and 18. The buttons on the left buttons 16 are to press and hold to identify which (in this example) Science word the user is about to select a definition. The buttons on the right 18 are for selecting the definition (in this example). Remember, the definitions were put into the TT in random order, as related to the words. So, the answer is not obvious to the user and knowledge is required to make the correct match. If the correct match is made the CORRECT display 12 is activated. If an incorrect match is made the TRY AGAIN display 14 is activated. SEE FIG. 1. Repeated practice with this activity, reinforces learning.

At the top are two LCD displays 12 and 14. One, when activated displays the word CORRECT 14. The second displays the words TRY AGAIN 14 when activated. These displays can be arranged in many ways and combinations. Side by side, one above the other or preferably combined into one display with two activation modes (one for each of the above described word(s)).

VARIATION OF SUBJECTS

The only limit to the variety of subjects applicable to this study method and this invention are the limit of which ones can be expressed in a multiple-choice format. Examples are math problems or multiplication tables, historical dates, events or people, Science, vocabulary, word usage in sentence examples with fill in the blanks. The format can be a word with a definition on either half of the paper or a sentence with a blank and the words on the other half of the paper. One sheet of paper can be used for only one subject but can be reused indefinitely. Also the sheets of paper would be different colors so the left and right halves can be matched up for use.

SUMMARY, RAMIFICATIONS AND SCOPE OF INVENTION

Accordingly, the reader will see that the "THOMAS TUTOR" can significantly improve the study habits and learning success of the student. A large variety of subjects are easily adapted to this note taking and MOCK TEST review method of study. The student can easily use the invention without assistance from parent or teacher, but a parent may easily observe to verify correct learning. It is also apparent that there are many valuable uses for the older student in their learning endeavors. The embodiment primarily described and preferred is the self powered version but the battery powered version is just as viable. Furthermore, the THOMAS TUTOR has the additional advantages in that it permits the user or student to reuse information entered on old TT paper at a later date, the different colored paper allows the user to match the same subject questions and answers even with several different subjects in use, its compact size and shape makes it very convenient to carry and to store, the self-powered factor allows the younger student to use it without parent support and also saves money without battery replacement, it allows hand written input of information allowing low cost, it allows the user to repeat the MOCK TEST as many times as needed to gain confidence in their grasp of the subject, it reinforces the learning that takes place as the user writes the important information in the form of questions and answers, it allows the user to prepare in advance for tests by writing this information from the early stages of learning the subject and using that written information for review just before a test.

preprinted paper media with prepared subjects can be made available for purchase.

Although the description above contains many specificities, these should not be construed as limiting the scope of the invention but merely providing illustrations of some of the presently preferred embodiments of this invention. For example, this note taking in the form of questions and answers and later review in the form of a MOCK TEST can be embodied in a computer or microprocessor base device. And also the TT could be employed in a preschool activity to learn sight words compared to pictures, colors, numbers and more.

Thus the scope of the invention should be determined by the appended claims and their legal equivalents, rather than by the examples given.

I claim:

1. A learning aid comprising:
   a) a media for recording information from learning activity for use in a review using a multiple-choice mock-test,
   b) said media has answer-to-question correlation function which allows random presentation of information for repeated use(,) and said media for recording information is a thin sheet of material suitable for retaining handwritten or typed or printed information and said media is subdivided by perforated lines that will be used to separate questions from answers and answers from one another,
   c) a main-unit which accepts said media in random order,
   d) said main-unit has a means for selecting questions in reference to said media and a means for the user to select corresponding answers in reference to said media,
   e) said main-unit has means to indicate to the user the correctness and incorrectness of their selections.

2. The learning aid of claim 1 wherein said main-unit utilizes a piezo material to supply electrical power to said means to indicate to the user the correctness and incorrectness of their selections(.) and said piezo material is incorporated into the structure of said means for the user to select corresponding answers in reference to said media.

* * * * *